J. J. Weeks.
Mower.
No. 2017 Reissued Jun. 27, 1865.
Fig. 1.
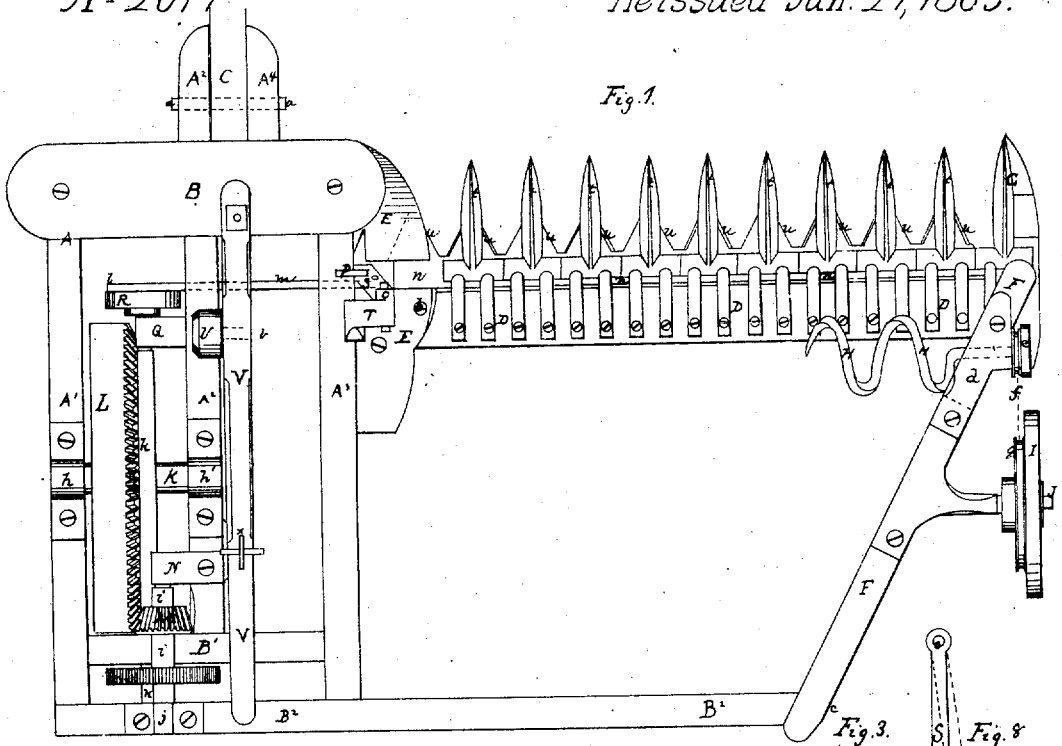
Fig. 3.
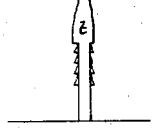
Fig. 8
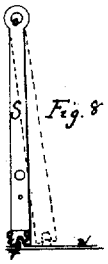
Fig. 6.
Fig. 5.
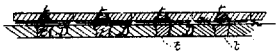
Fig. 7.
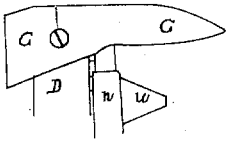
Fig. 2.
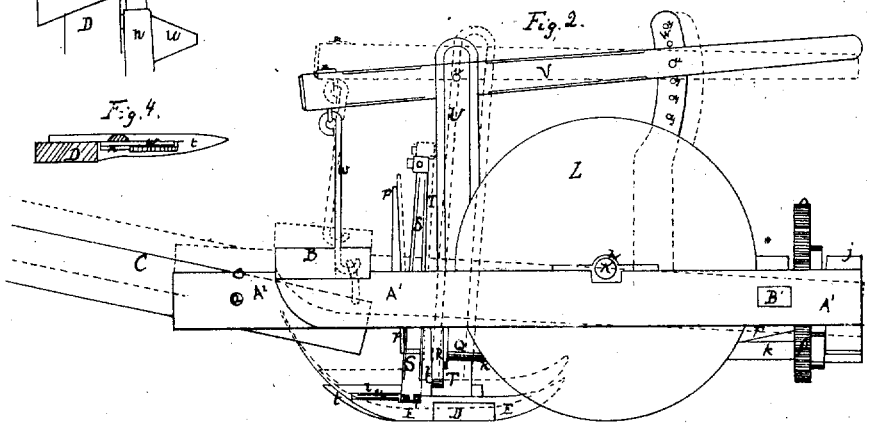
Fig. 4.
Witnesses
R. D. Smith
M. L. Dodge
Inventor
Andrew Whiteley

UNITED STATES PATENT OFFICE.

ANDREW WHITELEY, OF SPRINGFIELD, OHIO, ASSIGNEE, BY MESNE ASSIGNMENTS, OF JOHN J. WEEKS.

IMPROVEMENT IN HARVESTERS OF GRAIN AND GRASS.

Specification forming part of Letters Patent No. 11,735, dated September 26, 1854; Reissue No. 2,017, dated June 27, 1865.

DIVISION C.

*To all whom it may concern:*

Be it known that JOHN J. WEEKS, of Oyster Bay, in the county of Queens and State of New York, invented certain new and useful Improvements in Reaping and Mowing Machines, of which the following is a full, clear, and exact description, reference being had to the accompanying drawings, and the letters of reference marked thereon, in which—

Figure 1 is a plan or top view of his improved machine. Fig. 2 is a side elevation of the same, showing in red lines the action of the lever, &c. Fig. 3 is an under view of one of the fingers. Fig. 4 is a side view of one of the fingers, the cutter-bar being cut transversely. Fig. 5 is a front view of four fingers and a portion of the cutter-bar, the ends of the fingers being removed. Fig. 6 is a side view of the divider and end view of the cutter-bar and outer end cutter. Fig. 7 is an under side view of the same, the cutter-bar and cutter being in its inner reciprocation; and Fig. 8 is a detail showing the movement of the pendulum.

The nature of that part of the invention herein claimed will best be understood from the following description and explanations.

That side of the machine which is at the left hand when behind and facing it I call the "inner" side and that at the right the "outer" side. The main part of the frame A, to which the other parts of the machine are secured, is formed by placing three beams, A′, $A^2$, and $A^3$, parallel with each other and with the path they are to move in, and at right angles thereto three cross-beams, B, B′, and $B^2$, which are confined together by mortises and tenons and by screw-bolts, as follows: by making a mortise in A′ and $A^3$, near their rear ends, and a tenon on each end of B′, and inserting the tenons into the mortises; by making a mortise in B′ and a tenon on the rear end of $A^2$ and inserting the tenon into the mortise; by embedding the size of A′, $A^2$, and $A^3$ into the under side of B (which is made wide for that purpose) a sufficient distance to hold the parts in the same relative position when confined by screw-bolts, and also in the same manner a short beam, $A^4$, between which and $A^2$ the rear end of the tongue C vibrates upon a horizontal fulcrum-pin, *a*, which is in front of and above the fingers, as seen in Fig. 2 of the drawings; by making tenons on the rear ends of A′ and $A^3$, a slot in the inner end of $B^2$, into which the tenon on A′ is inserted, and a mortise in $B^2$, into which the tenon of $A^3$ is inserted. The inner end of the finger-bar D is placed in the bed formed in the under side of the shoe E, and there confined by the screw-bolts *b b*.

The beam $B^2$ is extended out from the main part of the frame, as shown in Fig. 1 of the drawings, and has connected to it by a mortise and tenon and joint-bolt *c* the rear end of beam F, which runs angling inward and upward from the outer end of the finger-bar, to which it is attached by a screw-bolt which is run up through the divider G, the finger-bar D, and into or through the front end of said beam F.

To the upper side of beam F, a short distance in rear of the finger-bar, is secured by screw-bolts (which enables it to be readily removed) the box *d*, in which the journal of the track-clearer H is made to revolve by placing upon its outer end the band-wheel *e*, which is driven by the band *f*, which is put in motion by the band-wheel *g*, and backward by crossing the band *f*.

I is the grain-wheel, whose axle J is about in the same vertical plane with the axle K of the cutter's driving-wheel L, which revolves in the boxes *h* and *h*′, and has cogs on its outer side, which mesh into a bevel-pinion, M, on and near the front end of a shaft, *i*, which is sustained by and revolves in the projecting end of N.

On and near the rear end of shaft *i*, which is sustained in the box *j*, is secured the spur-driver O, which meshes into and drives the pinion P on and near the rear end of the crank-shaft *k*, which revolves in a box seen at Fig. 2, and has its front end sustained by and revolves in the downward-projecting end Q, which is secured to the under side of $A^2$. On the front end of *k* is secured a fly-wheel, R, into which is inserted a wrist-pin, *l*, to which is confined in the proper manner the inner end of the cutter's driving-pitman *m*. The outer end of said pitman has its connection with the cutter-bar *n* through the medium of a pendulum, S, as seen in Fig. 2 of the drawings, which has its upper end hinged at *o* to the upper end of a post, T, which is secured to $A^3$, and has upon its lower end the shoe E.

The outer end of the pitman *m*, it will be observed, is prevented from coming out of the pendulum S, into which it is hooked, by the post T. The pendulum S is prevented from swaying from the post T, so as to let the outer end of the pitman work out of it, by the coiled spring *p*, which has its upper end inserted into the beam $A^3$ and its lower end into the pendulum S. The lower end of the pendulum S is made forked, so as to form two cogs *q*, and $q^2$, and below *q* a holding-pin, *r*, which works in a small slot in the cutter-bar, and prevents the cogs on the pendulum from slipping endwise off the cogs on the upper side of the cutter-bar when not otherwise prevented from so doing. By having the pendulum thus connected to the cutter-bar the cutter-bar is reciprocated across and through the slots of the shoe, fingers, and divider in straight lines, as a rack is moved by a vibrating pinion.

By having the shoe E constructed and connected to the frame A in the manner shown by Figs. 1 and 2 of the drawings it will be observed the shoe not only sustains the end of the finger-bar at such a distance below the frame as to have the necessary open space between itself, the frame, and the vertical plane in which the cutter's driving-wheel moves for the cut grass, &c., to lie in without being dragged forward, and guides the inner end of the cutter-bar *n* across the fingers and divider in straight lines, but also is extended forward and upward in such a direction, until connected to the frame, as to slide freely over the cut grass, when lying in its road, without dragging it, and backward and upward from the bottom of the finger-bar, so as to be slid backward with ease and without dragging the grass.

*t t t t t t t t t* are the fingers with horizontal slots in them corresponding with that in the shoe, and with that in the divider G, as seen in Figs. 4 and 6 of the drawings, which also show their upper and lower parts the proper distance apart to have each of the upper parts of the rear ends of the fingers rest upon the upper side of the finger-bar when the lower part of the finger is driven into a horizontal hole in the finger-bar, to which said upper parts each are secured by a screw, as shown in Fig. 1 of the drawings, which also shows the braces over the cutter-bar extending out from each side of the upper part of the fingers until they meet centrally between them.

By constructing and connecting the fingers to the finger-bar, as shown, it will be observed that neither of the upper parts of the fingers are over the lower part, which passes through the finger-bar, and that there is no screw or bolt passed through the lower part of the finger, which weakens it and makes it troublesome to remove when broken or worn out, and which it is always troublesome to do, as it is not easy to know where to make a hole in the finger-bar which will exactly agree, as it should, with that in the finger. It will be observed that the width of bearing which said upper parts of the fingers have on the finger-bar holds the fingers much more firmly than when having no greater width of bearing on the bar than the size of the part which passes through the finger-bar, and also that the braces coming together in front of the finger-bar adds greatly to the strength of the fingers. The lower part of each finger has notches in its edges, as seen in Fig. 3 of the drawings, for preventing the standing crop from being crowded forward by the angle of the cutter's edges to the fingers' edges.

*u u u u u u u u u* are the several sections or cutters of which the cutter is formed, the same in number as the fingers *t* and divider G, and the same distance between centers, when on the cutter-bar *n*, as the points of the fingers are distant from each other, and when together on the bar *n*, whose outer end terminates with the outer end of the outer end cutter, forms what I term a "short" cutter, the outer end of which cutter is about midway between the inner edge of those parts of the divider against which the crop is cut and the same parts of the outer edge of the finger next to the divider when in its inner reciprocation, as seen in Figs. 1 and 6 of the drawings.

By having harvester's cutters, and especially those for mowing, of the length of that herein described, and therewith combined a divider, a portion of which is as low as the finger-bar, both of those portions against which the crop is cut of a less width than the length of a section of said cutter, and that portion next in rear of those portions against which the crop is cut extended as far inward as the outer end of said cutter is reciprocated, as shown by Figs. 1 and 7 of the drawings, so that the cutter will not be prevented from returning outward, the grass cut by the outer section of the cutter is cut in a very perfect manner; but it will be observed that the utility of the combination of this short cutter and narrow divider depends very much upon the manner in which they are combined with the axle of the cutter's driving-wheel, and upon the other parts combined with them; and, also, that the cutting apparatus of which this short cutter and narrow divider form parts is connected to the axle of the cutter's driving-wheel in such a manner as to rise and fall with the undulations of the ground over which it is drawn, and thereby to cut the grass close to the ground irrespective of the risings and fallings of said axle, and has combined with it a track-clearer so constructed as to remove the cut from the uncut grass by a revolving motion, which removes it with less power applied, leaves it more evenly spread over the ground, and less pressed into the stubble than when otherwise removed.

U is a post, which is secured at $A^2$ and supports the fulcrum-pin *v* of the lever V, which has its front end connected to the rear end of the tongue C by a link-connection, *w*, as seen in side view, 2, and in rear of the post U a holding-standard, W, which has its lower end secured to $A^2$ and its upper end curved to suit the arc which the mortise $x$ in the lever through which it passes moves, and also a series of holes, $y$, in its upper end, through the desired one of which the attendant of the machine passes a pin, $z$, above the lever V, so that the cutting apparatus will be free to rise and fall with the ordinary undulations of the ground when mowing, but prevented from dropping into deep furrows or ditches when drawn over them.

When the machine is used for reaping or is being moved from place to place the pin $z$ may be put through the hole $a'$ in the lever V, as seen in Fig. 2 of the drawings, but need not necessarily be done so, as the weight of the front end of the frame and the cutting apparatus thereto secured is always bearing the front end of the lever V down and the handle end up to the pin $z$, except when the cutting apparatus is raised by passing over something in its road.

By the combination of the lever V with the frame, tongue, cutting apparatus, and two supporting-wheels of a harvesting-machine which has its cutting apparatus run on the ground at times for mowing, and rises and falls with the undulations thereof, and at other times carried above it by the bearing of the tongue in the neck-yoke or its equivalent, and said two supporting-wheels without other support, the attendant of the machine raises and lowers said cutting apparatus from and to the ground by operating upon and vibrating the handle end of the lever V in the proper direction upon its fulcrum-pin $v$. This the attendant, as will be observed, can do when the machine is in operation, and therefore raise said cutting apparatus over an obstruction which would be liable to break it if not so raised, and when over the obstruction lower it down again to the ground, so as to cut the grass, &c., close to it; and by the aid of the holding device for the handle end of the lever the attendant, as will be seen by reference to Fig. 2 of the drawings, is enabled to have said end of the lever held at such various positions as will hold the cutting apparatus at the desired height for moving the machine from place to place or for reaping, and when used for reaping to change the height of said apparatus while the machine is in operation, so that it will cut the crop closer to the ground where desired and farther from it where desired without stopping the machine for so doing, as is often necessary at different sides or parts of the same field.

From the foregoing description and explanations, and without further invention, I believe that any one skilled in the art is enabled to construct and use that part of the invention herein claimed.

What I claim under this patent as the invention of the aforesaid JOHN J. WEEKS, is—

1. Making that portion of the upper part of the guard-fingers of a harvester which rests on the finger-bar in two parts, one on either side of the lower part, but neither of them over it, or any screw or bolt passing through it and the finger-bar, through which it is passed.

2. The combination of the herein-described short cutter and narrow divider and a track-clearer with a harvester's finger-bar which is connected to the axle of the cutter's driving-wheel in such a manner as to rise and fall with the undulations of the ground over which it is drawn, irrespective of the risings and fallings of said axle.

3. The combination of a revolving track-clearer with the outer end of a harvester's finger-bar in such a manner as to have no part of the machine between the ground and that part of this track-clearer which separates the cut from the uncut grass, neither any part of it between the finger-bar, the revolving track-clearer, and that part by which it is connected to the finger-bar.

4. The combination of a revolving track-clearer with the outer end of a harvester's finger-bar, and a wheel connected therewith in such a manner that the attendant of the machine can, while the machine is in operation, make this wheel carry said end or not, as he desires, substantially as shown and described.

In testimony whereof I have hereunto subscribed my name before two witnesses.

ANDREW WHITELEY.

Witnesses:

WM. H. HARRISON,

J. H. JOHNSON.